(12) United States Patent
Omori

(10) Patent No.: US 11,224,854 B2
(45) Date of Patent: Jan. 18, 2022

(54) POROUS FORMED ARTICLE, METHOD FOR PRODUCING POROUS FORMED ARTICLE, AND PRODUCTION APPARATUS FOR POROUS FORMED ARTICLE

(71) Applicant: Asahi Kasei Kabushiki Kaisha, Tokyo (JP)

(72) Inventor: Akihiro Omori, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 771 days.

(21) Appl. No.: 15/775,048

(22) PCT Filed: Nov. 11, 2016

(86) PCT No.: PCT/JP2016/083601
§ 371 (c)(1),
(2) Date: May 11, 2018

(87) PCT Pub. No.: WO2017/082420
PCT Pub. Date: May 18, 2017

(65) Prior Publication Data
US 2018/0369781 A1    Dec. 27, 2018

(30) Foreign Application Priority Data

Nov. 11, 2015  (JP) .............................. JP2015-221666

(51) Int. Cl.
| | | |
|---|---|---|
| *B01J 20/06* | (2006.01) | |
| *B01J 20/08* | (2006.01) | |
| *B01J 2/06* | (2006.01) | |
| *C02F 1/28* | (2006.01) | |
| *B01J 20/30* | (2006.01) | |
| *B01J 20/28* | (2006.01) | |
| *B01J 20/26* | (2006.01) | |
| *C08J 9/28* | (2006.01) | |
| *C01G 25/02* | (2006.01) | |
| *C01F 17/212* | (2020.01) | |
| *C01F 17/218* | (2020.01) | |
| *C01F 17/224* | (2020.01) | |
| *C01F 17/229* | (2020.01) | |
| *C01F 17/235* | (2020.01) | |
| *B01D 15/08* | (2006.01) | |
| *B01J 20/10* | (2006.01) | |

(52) U.S. Cl.
CPC .............. *B01J 20/06* (2013.01); *B01D 15/08* (2013.01); *B01J 2/06* (2013.01); *B01J 20/08* (2013.01); *B01J 20/261* (2013.01); *B01J 20/264* (2013.01); *B01J 20/28004* (2013.01); *B01J 20/28019* (2013.01); *B01J 20/28059* (2013.01); *B01J 20/28085* (2013.01); *B01J 20/3007* (2013.01); *B01J 20/3021* (2013.01); *B01J 20/3071* (2013.01); *C01F 17/212* (2020.01); *C01F 17/218* (2020.01); *C01F 17/224* (2020.01); *C01F 17/229* (2020.01); *C01F 17/235* (2020.01); *C01G 25/02* (2013.01); *C02F 1/28* (2013.01); *C08J 9/28* (2013.01); *B01J 20/10* (2013.01); *B01J 2220/42* (2013.01); *B01J 2220/52* (2013.01); *B01J 2220/58* (2013.01); *C02F 1/281* (2013.01); *C02F 1/285* (2013.01)

(58) Field of Classification Search
CPC ..... B01J 20/06; B01J 2/06; B01J 20/08; B01J 20/28019; B01J 20/28059; B01J 20/28085; B01J 20/3007; B01J 20/3021; C02F 1/28; C02F 1/281; C02F 1/285
USPC ......................................................... 502/402
See application file for complete search history.

(56) References Cited

U.S. PATENT DOCUMENTS

| | | |
|---|---|---|
| 2007/0128424 A1 | 6/2007 | Omori et al. |
| 2011/0165308 A1 | 7/2011 | Shiki |
| 2012/0219799 A1 | 8/2012 | Omori |

FOREIGN PATENT DOCUMENTS

| | | |
|---|---|---|
| CN | 102164656 A | 8/2011 |
| EP | 2332638 A1 | 6/2011 |
| EP | 2502959 A1 | 9/2012 |
| JP | 2006-000818 A | 1/2006 |
| JP | 2009-195843 A | 9/2009 |
| JP | 2009-297707 A | 12/2009 |
| JP | 2010-106071 A | 5/2010 |
| WO | 2005/056175 A1 | 6/2005 |

(Continued)

OTHER PUBLICATIONS

European Search Report issued in corresponding European Patent Application 16864381.5 dated Jan. 28, 2019.
International Preliminary Report on Patentability and Written Opinion issued in corresponding International Patent Application No. PCT/JP2016/083601 dated May 15, 2018.

(Continued)

*Primary Examiner* — Edward M Johnson
(74) *Attorney, Agent, or Firm* — Morgan, Lewis & Bockius LLP

(57) ABSTRACT

A porous formed article includes an organic polymer resin and an inorganic ion adsorbent and having the most frequent pore size of 0.08 to 0.70 µm measured with a mercury porosimeter. Such a porous formed article can be prepared by crushing and mixing a good solvent for the organic polymer resin and the inorganic ion adsorbent to obtain slurry; dissolving the organic polymer resin and a water-soluble polymer in the slurry; shape-forming the slurry; promoting coagulation of the shape-formed product by controlling the temperature and humidity of a spatial portion coming into contact with the shape-formed product, until the shape-formed product is coagulated in a poor solvent; and coagulating the coagulation-promoted shape-formed product in a poor solvent. A production apparatus can be used to prepare such a porous formed article.

12 Claims, 3 Drawing Sheets

(56) References Cited

FOREIGN PATENT DOCUMENTS

WO 2011/062277 A1 5/2011

OTHER PUBLICATIONS

Partial Supplemental European Search Report issued in corresponding European Patent Application No. 16864381.5 dated Oct. 24, 2018.
International Search Report issued in corresponding International Patent Application No. PCT/JP2016/083601 dated Feb. 14, 2017.

[Figure 1]
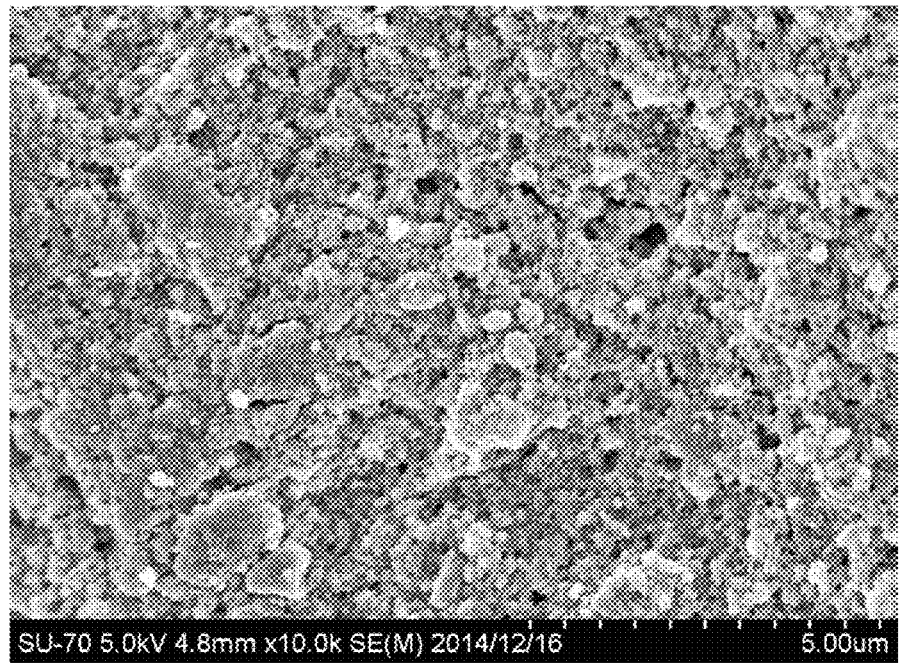
[Figure 2]
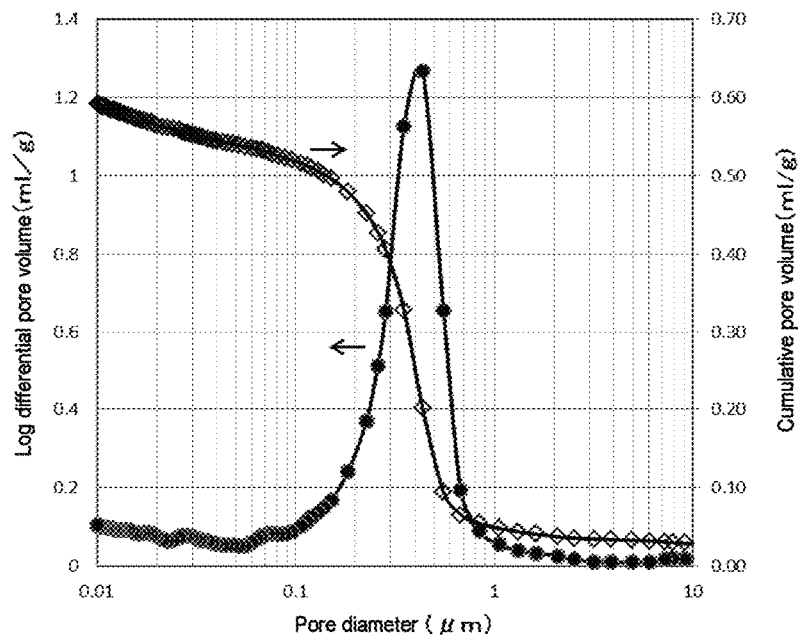

[Figure 3]
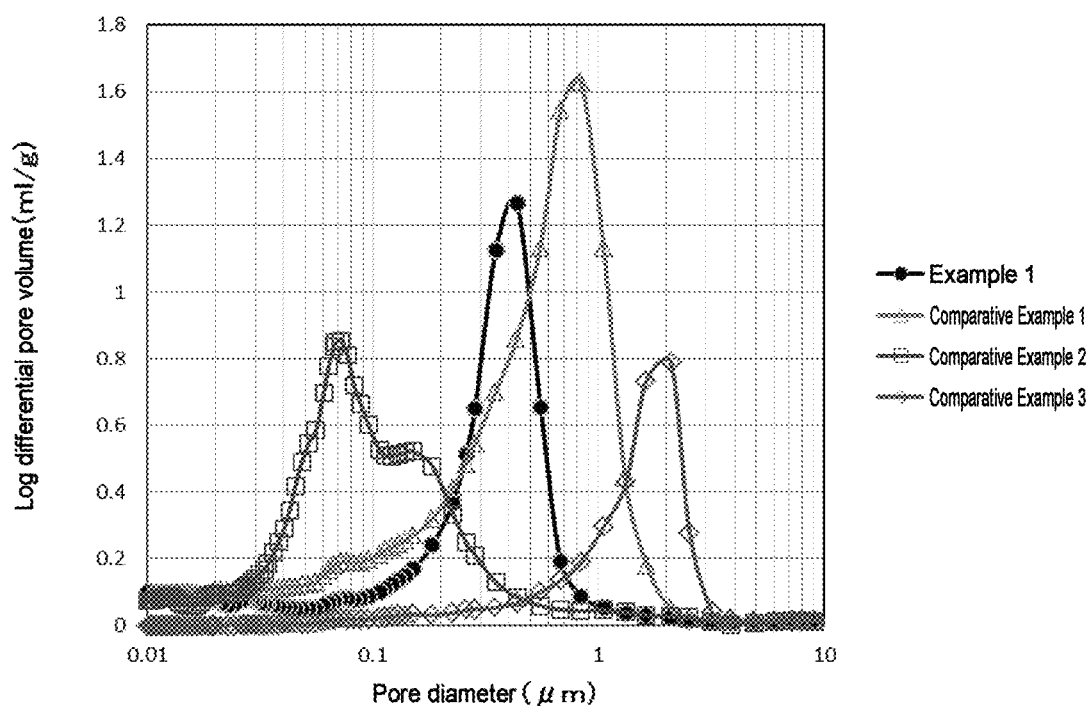

[Figure 4]
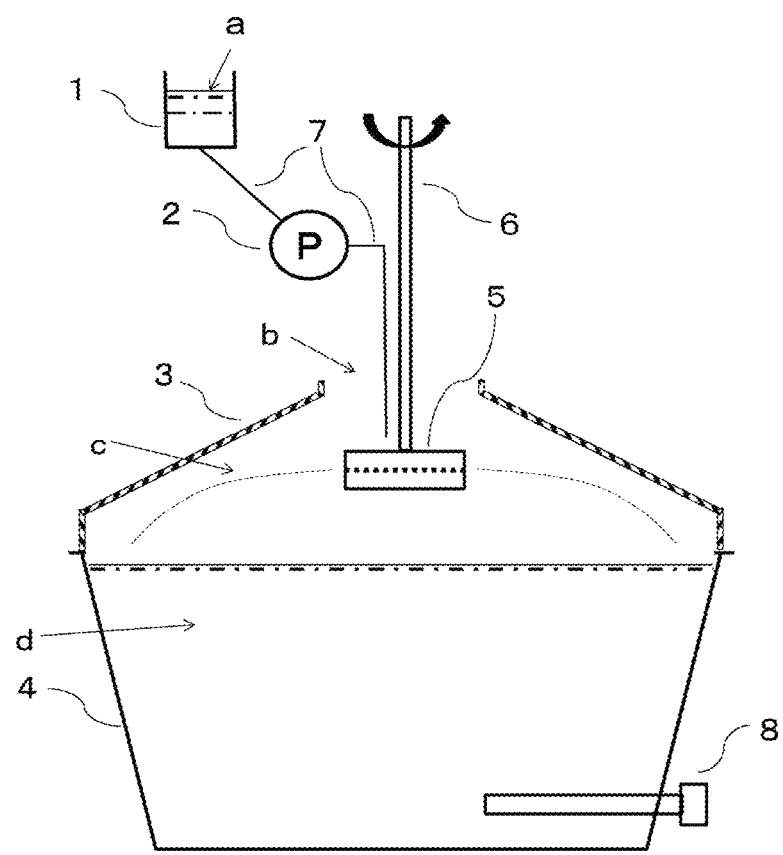

POROUS FORMED ARTICLE, METHOD FOR PRODUCING POROUS FORMED ARTICLE, AND PRODUCTION APPARATUS FOR POROUS FORMED ARTICLE

TECHNICAL FIELD

The present invention relates to a porous formed article, a method for producing a porous formed article, and a production apparatus for a porous formed article.

BACKGROUND ART

In recent years, environmental standards against harmful substances such as phosphorus, boron, arsenic and fluorine in drinking water, industrial water, industrial effluent, sewage treatment water and various environmental waters have been strengthened in terms of eutrophication problems caused by environmental pollution. Thus, there has been a growing demand for techniques for removing these harmful substances.

Phosphorus, one of the causative substances of eutrophication, is more strongly controlled, particularly, in closed water. Also, techniques for recovering and reusing phosphorus from effluent have been demanded because the depletion of this element is also of concern.

Boron is an essential element for plant cultivation, but is known to have adverse effects on plant growth when present excessively. As for human bodies, the possibility has been pointed out that boron contained in drinking water influences the health and particularly causes health problems such as reduction in reproductive functions.

Arsenic is contained in effluent from the non-ferrous metal refining industry, thermal discharges from geothermal power plants and ground water of specific areas, etc. The toxicity of arsenic has been long known. Reportedly, arsenic is bioaccumulative and causes chronic intoxication, weight loss, disturbance of perception, liver disorder, dermal deposition and skin cancer, etc.

Fluorine is contained in large amounts in effluent from the metal refining industry, the glass industry and the electronic material industry, etc. The influence of fluorine on human bodies is of concern. Excessive ingestion of fluorine is known to cause chronic fluorine poisoning such as fluorosis, bone sclerosis and thyroid gland disorder.

The outputs of these harmful substances are increasing yearly. Thus, there is a demand for techniques for efficiently removing these harmful substances. There is also a growing demand for the selective removal of specific ions such as phosphate or borate ions in the field of conventional effluent processing as well as from water for use in metal plating, pharmaceutical production, etc.

For example, techniques using an adsorbing agent comprising an inorganic ion adsorbent powder such as aqueous ferrite of zirconium or aqueous cerium oxide carried by a polymer material are known as techniques for removing various harmful substances as mentioned above.

Also, a porous formed article comprising an organic polymer resin and an inorganic ion adsorbent is known to adsorb phosphorus, boron, or the like.

For example, Patent Literature 1 discloses that a formed article having no skin layer on the surface and having excellent surface opening properties is obtained by the adoption of a method which involves dissolving an organic polymer resin in an appropriate good solvent, further dissolving and mixing therein a water-soluble polymer that is soluble in the good solvent and has affinity for the organic polymer resin, and suspending an inorganic ion adsorbent powder as an adsorption substrate in the resulting polymer solution, followed by shape forming in a coagulation bath containing a poor solvent.

Patent Literature 2 discloses that a porous formed article having only a small amount of secondary aggregates of an inorganic ion adsorbent in the porous formed article is excellent in adsorption performance and also has large strength.

Patent Literature 3 discloses that a porous formed article comprising an organic polymer resin having a hydroxy group and an inorganic ion adsorbent powder is a porous formed article that is highly durable against a washing agent such as an oxidizing agent, repetitively usable, and suitable for adsorbing agents.

Adsorbing agents consisting of the porous formed articles disclosed in Patent Literatures 1 to 3 are free from a thin membrane, called a skin layer, on the surface of the porous formed articles and are excellent in the internal porosity of the adsorbing agents. Therefore, a feature of these adsorbing agents is that the diffusion rate of an object to be adsorbed such as phosphorus or boron into the inside of the adsorbing agents is fast. Patent Literatures 1 to 3 further disclose that adsorption is performed at a fluid flow rate (SV) of 30.

CITATION LIST

Patent Literature

Patent Literature 1: International Publication No. WO 2005/056175
Patent Literature 2: Japanese Patent Laid-Open No. 2009-297707
Patent Literature 3: International Publication No. WO 2011/062277

SUMMARY OF INVENTION

Technical Problem

However, in recent years, ultrahigh-speed processing at SV120 much faster than the conventional fluid flow rate of SV30 has been required, particularly, for the purpose of using water in metal plating, pharmaceutical production, etc.

There is a demand for further improvement in the conventional porous formed articles as disclosed in Patent Literatures 1 to 3.

An object of the present invention is to provide a porous formed article that can remove ions, particularly, phosphate ions, in water to be processed at an ultrahigh speed and has a large adsorption capacity.

Solution to Problem

The present inventors have conducted diligent studies and consequently completed the present invention by finding that the problems described above can be solved by a porous formed article comprising an organic polymer resin and an inorganic ion adsorbent and having the most frequent pore size of 0.08 to 0.70 μm measured with a mercury porosimeter.

Specifically, the present invention is as follows:
[1]
A porous formed article comprising an organic polymer resin and an inorganic ion adsorbent and having the most frequent pore size of 0.08 to 0.70 μm measured with a mercury porosimeter.

[2]
The porous formed article according to [1], wherein an outer surface opening ratio is 5% or more and less than 30%.
[3]
The porous formed article according to [1] or [2], wherein a specific surface area measured with a mercury porosimeter is 10 to 100 m²/cm³.
[4]
The porous formed article according to any of [1] to [3], wherein a ratio of the most frequent pore size of a median size (the most frequent pore size/median size) measured with a mercury porosimeter is 0.80 to 1.30.
[5]
The porous formed article according to any of [1] to [4], wherein the porous formed article is spherical particles having an average particle size of 100 to 2500 μm.
[6]
The porous formed article according to any of [1] to [5], wherein the inorganic ion adsorbent contains at least one metal oxide represented by the following formula (I):

$$MN_xO_n \cdot mH_2O \quad (I)$$

wherein x is 0 to 3, n is 1 to 4, m is 0 to 6, and M and N are different from each other and each represent a metal element selected from the group consisting of Ti, Zr, Sn, Sc, Y, La, Ce, Pr, Nd, Sm, Eu, Gd, Tb, Dy, Ho, Er, Tm, Yb, Lu, Al, Si, Cr, Co, Ga, Fe, Mn, Ni, V, Ge, Nb and Ta.
[7]
The porous formed article according to [6], wherein the metal oxide contains at least one material selected from any of the following groups (a) to (c):
(a) hydrous titanium oxide, hydrous zirconium oxide, hydrous tin oxide, hydrous cerium oxide, hydrous lanthanum oxide and hydrous yttrium oxide,
(b) a mixed metal oxide of at least one metal element selected from the group consisting of titanium, zirconium, tin, cerium, lanthanum and yttrium, and at least one metal element selected from the group consisting of aluminum, silicon and iron, and
(c) activated alumina.
[8]
The porous formed article according to any of [1] to [7], wherein the organic polymer resin contains at least one component selected from the group consisting of an ethylene vinyl alcohol copolymer (EVOH), polyacrylonitrile (PAN), polysulfone (PS), polyethersulfone (PES) and polyvinylidene fluoride (PVDF).
[9]
A column packed with a porous formed article according to any of [1] to [8].
[10]
A method for producing a porous formed article comprising an organic polymer resin and an inorganic ion adsorbent, comprising the steps of:
(1) crushing and mixing a good solvent for the organic polymer resin and the inorganic ion adsorbent to obtain slurry;
(2) dissolving the organic polymer resin and a water-soluble polymer in the slurry obtained in the step (1);
(3) shape-forming the slurry obtained in the step (2);
(4) promoting coagulation of the shape-formed product obtained in the step (3) by controlling the temperature and humidity of a spatial portion coming into contact with the shape-formed product, until the shape-formed product is coagulated in a poor solvent; and
(5) coagulating the coagulation-promoted shape-formed product obtained in the step (4), in a poor solvent.

[11]
The method for producing a porous formed article according to [10], wherein a relative humidity of the spatial portion coming into contact with the shape-formed product in the step (4) is 65 to 100%.
[12]
The method for producing a porous formed article according to [10] or [11], wherein the good solvent for the organic polymer resin is at least one solvent selected from the group consisting of dimethyl sulfoxide (DMSO), N-methyl-2-pyrrolidone (NMP), dimethylacetamide (DMAC) and dimethylformamide (DMF).
[13]
The method for producing a porous formed article according to any of [10] to [12], wherein the poor solvent is water or a mixture of the good solvent for the organic polymer resin and water.
[14]
The method for producing a porous formed article according to any of [10] to [13], wherein a temperature of the poor solvent in the step (5) is 40 to 100° C.
[15]
The method for producing a porous formed article according to any of [10] to [14], wherein the step (3) comprises the step of using a nozzle disposed on a side of a rotating container so that the slurry obtained in the step (2) is scattered from the nozzle to form liquid drops.
[16]
A production apparatus for a porous formed article comprising a rotary container which scatters liquid drops by centrifugal force, and a coagulation vessel which retains a coagulating liquid, and comprising a control unit which has a cover placed over a spatial portion between the rotary container and the coagulation vessel and controls the temperature and humidity of the spatial portion.
[17]
The production apparatus for a porous formed article according to [16], wherein the control unit is a unit which warms the coagulating liquid retained in the coagulation vessel to control the temperature and humidity of the spatial portion through the use of steam generated from the coagulating liquid.

Advantageous Effects of Invention

The present invention can provide a porous formed article that can remove ions, particularly, phosphate ions, in processed water at an ultrahigh speed and has a large adsorption capacity.

BRIEF DESCRIPTION OF DRAWINGS

FIG. 1 shows an electron microscope photograph (magnification: ×10,000) showing the outer surface of a porous formed article obtained in Example 1.
FIG. 2 shows the pore distribution diagram of the porous formed article obtained in Example 1, wherein a log differential pore volume and a cumulative pore volume were plotted against a pore diameter measured with a mercury porosimeter.
FIG. 3 shows the pore distribution diagram of porous formed articles obtained in Example 1 and Comparative Examples 1, 2 and 3, wherein a log differential pore volume was plotted against a pore diameter measured with a mercury porosimeter.

FIG. 4 is a schematic diagram showing a production apparatus for the porous formed article of the present embodiment.

DESCRIPTION OF EMBODIMENTS

Hereinafter, the mode for carrying out the present invention (hereinafter, referred to as the present embodiment) will be described. However, the present invention is not limited by the embodiments described below, and various changes or modifications can be made therein without departing from the scope of the present invention.

[Porous Formed Article]

The porous formed article of the present embodiment comprises an organic polymer resin and an inorganic ion adsorbent and has the most frequent pore size of 0.08 to 0.70 μm measured with a mercury porosimeter. The porous formed article of the present embodiment has continuous holes and has a porous structure.

The porous formed article of the present embodiment has the most frequent pore size of 0.08 to 0.70 μm, preferably 0.10 to 0.60 μm, more preferably 0.20 to 0.50 μm, measured with a mercury porosimeter.

In the present embodiment, the most frequent pore size (modal diameter) means a pore diameter that exhibits the largest value of a log differential pore volume on a diagram in which the log differential pore volume (dV/d (log D), wherein V represents a mercury penetration volume, and D represents a pore diameter) is plotted against the pore diameter measured with a mercury porosimeter, and is based on a volume. Specifically, the most frequent pore size can be measured by a method described in Examples.

The mercury porosimeter is an apparatus for evaluating the sizes of pores in porous materials according to the mercury penetration method, and is suitable for the measurement of relatively large pore distributions (mesopores (several nm) to macropores (several hundreds of μm)) which cannot be measured by the gas adsorption method (BET method).

In the present embodiment, the most frequent pore size can be measured with the mercury porosimeter to thereby measure the detailed features of the porous structure (skeletal structure) consisting of the organic polymer resin in the porous formed article. Also, a median size and a specific surface area can be measured with the mercury porosimeter to thereby measure the detailed features of the porous structure (skeletal structure) consisting of the organic polymer resin in the porous formed article.

The most frequent pore size of 0.08 μm or larger is sufficient as the pore size of continuous holes for diffusing an object to be adsorbed such as phosphorus or boron into the inside of the porous formed article, and accelerates a diffusion rate. The most frequent pore size of 0.70 μm or smaller is suitable for adsorbing many ions at the time of high-speed flushing because voids in the porous formed article are decreased so that the abundance of the inorganic ion adsorbent per unit volume is dense.

The outer surface opening ratio of the porous formed article is preferably 5% or more and less than 30%, more preferably 7% or more and 28% or less, further preferably 10% or more and 25% or less.

In the present embodiment, the outer surface opening ratio means the ratio of the total opening area of all holes to the area of a viewing field when the outer surface of the porous formed article is observed under a scanning electron microscope.

The outer surface opening ratio of 5% or more accelerates the diffusion rate of an object to be adsorbed such as phosphorus or boron into the inside of the porous formed article. The outer surface opening ratio of less than 30% allows ions in water to be reliably adsorbed even in high-speed fluid flow because the abundance of the inorganic ion adsorbent on the outer surface of the porous formed article is large.

In the present embodiment, the outer surface opening ratio is actually measured by observing the outer surface of the porous formed article at ×10,000. Specifically, the outer surface opening ratio can be measured by a method described in Examples.

The ratio of the most frequent pore size to a median size (the most frequent pore size/median size) measured with a mercury porosimeter, of the porous formed article of the present embodiment is preferably 0.80 to 1.30, more preferably 0.85 to 1.25, further preferably 0.90 to 1.20.

In the present embodiment, the median size means a pore diameter corresponding to a median value in the range from the largest value to the smallest value of cumulative pore volumes in a cumulative pore volume distribution, and is based on a volume. Specifically, the median size can be measured by a method described in Examples.

The most frequent pore size/median size ratio close to 1.0 is suitable for high-speed flushing because of the uniform pore size distribution of the porous formed article.

When a dense layer having a small pore size (skin layer) is present in the vicinity of the outer surface of the porous formed article, large voids (layer with the largest pore size) are easily formed on the inner side (inside direction of the formed article) of the skin layer. The most frequent pore size/median size ratio of 0.80 to 1.30 means that the skin layer is absent in the porous formed article.

The specific surface area measured with a mercury porosimeter, of the porous formed article of the present embodiment is preferably 10 to 100 m$^2$/cm$^3$, more preferably 11 to 90 m$^2$/cm$^3$, further preferably 12 to 50 m$^2$/cm$^3$.

The specific surface area of 10 m$^2$/cm$^3$ or larger produces sufficient adsorption performance at the time of high-speed flushing because the amount of the inorganic ion adsorbent carried is large and the pore surface area is large. The specific surface area of 100 m$^2$/cm$^3$ or smaller produces the high strength of the porous formed article because the inorganic ion adsorbent is firmly carried.

In the present embodiment, the specific surface area is defined according to the following expression:

$$\text{Specific surface area (m}^2\text{/cm}^3\text{)} = S(Hg) \text{ (m}^2\text{/g)} \times \text{Bulk specific gravity (g/cm}^3\text{)}$$

S(Hg) means the pore surface area (m$^2$/g) per unit weight of the porous formed article. A method for measuring the pore surface area involves drying the porous formed article in vacuum at room temperature, followed by measurement using a mercury porosimeter. Specifically, the pore surface area can be measured by a method described in Examples.

A method for measuring the bulk specific gravity is as follows.

When the porous formed article is in the form of particles, a cylinder, a hollow cylinder or the like and is short in shape, the apparent volume of the porous formed article in a wet state is measured with 1 mL regarded as 1 cm$^3$ using a measuring cylinder or the like. Then, the porous formed article is dried in vacuum at room temperature, and its weight is determined. The bulk specific gravity is calculated according to weight/volume.

When the porous formed article is in the form of a thread, a hollow fiber, a sheet or the like and is long in shape, the cross-section area and length of the wet porous formed article are measured. The volume is calculated from the product thereof. Then, the porous formed article is dried in vacuum at room temperature, and its weight is determined. The bulk specific gravity is calculated according to weight/volume.

The porous formed article of the present embodiment is preferably substantially spherical with an average particle size of 100 to 2500 µm. The average particle size is more preferably 150 to 2000 µm, further preferably 200 to 1500 µm.

The porous formed article of the present embodiment is preferably spherical particles. The spherical particles may be true spheres or oval spheres.

The average particle size of 100 µm or larger is suitable for high-speed flushing because pressure drop is small when a column, a tank or the like is packed with the porous formed article. The average particle size of 2500 µm or smaller allows ions to be reliably adsorbed even in high-speed fluid flow because the surface area of the porous formed article can be large when a column or a tank is packed with the porous formed article.

In the present embodiment, the average particle size means a median size of a sphere-equivalent diameter determined from the angle distribution of scattered light intensity of laser light diffraction when the porous formed article is regarded as a sphere. Specifically, the average particle size can be measured by a method described in Examples.

(Organic Polymer Resin)

The organic polymer resin constituting the porous formed article of the present embodiment is not particularly limited and is preferably a resin that can be rendered porous by an approach based on wet phase separation.

Examples of the organic polymer resin include polysulfone polymers, polyvinylidene fluoride polymers, polyvinylidene chloride polymers, acrylonitrile polymers, polymethyl methacrylate polymers, polyamide polymers, polyimide polymers, cellulose polymers, ethylene vinyl alcohol copolymer-based polymers and many types.

Among them, an ethylene vinyl alcohol copolymer (EVOH), polyacrylonitrile (PAN), polysulfone (PS), polyethersulfone (PES) and polyvinylidene fluoride (PVDF) are preferred because of non-swellability in water, biodegradation resistance, and easy production.

The organic polymer resin is preferably polyethersulfone terminally having a hydroxy group. The organic polymer resin having a hydroxy group as a terminal group can exert excellent carrying performance for the inorganic ion adsorbent in the porous formed article of the present embodiment. In addition, the highly hydrophobic organic polymer resin is improved in hydrophilicity because of terminally having a hydroxy group, and is less likely to cause fouling even when the porous formed article of the present embodiment is used for the purpose of processing water.

(Inorganic Ion Adsorbent)

The inorganic ion adsorbent constituting the porous formed article of the present embodiment means an inorganic substance that exhibits an ion adsorption event or an ion exchange event.

Examples of the inorganic ion adsorbent of natural origin include various mineral substances such as zeolite and montmorillonite.

Specific examples of the various mineral substances include kaolin mineral having a single-layer lattice of aluminosilicate, muscovite having a two-layer lattice structure, glauconite, Kanuma soil, pyrophyllite, talc, feldspar having a three-dimensional skeletal structure, zeolite and montmorillonite.

Examples of the inorganic ion adsorbent of synthetic origin include metal oxides, salts of polyvalent metals and insoluble aqueous oxides. The metal oxides include mixed metal oxides, mixed metal hydroxides and aqueous oxides of metals.

The inorganic ion adsorbent preferably contains at least one metal oxide represented by the following formula (I) from the viewpoint of adsorption performance for an object to be adsorbed:

$$MN_xO_n \cdot mH_2O \quad (I)$$

In the formula (I), x is 0 to 3, n is 1 to 4, m is 0 to 6, and M and N are different from each other and each represent a metal element selected from the group consisting of Ti, Zr, Sn, Sc, Y, La, Ce, Pr, Nd, Sm, Eu, Gd, Tb, Dy, Ho, Er, Tm, Yb, Lu, Al, Si, Cr, Co, Ga, Fe, Mn, Ni, V, Ge, Nb and Ta.

The metal oxide may be a non-aqueous (non-hydrous) metal oxide represented by the formula (I) wherein m is 0, or may be an aqueous metal oxide (hydrous metal oxide) represented by the formula (I) wherein m is a numerical value other than 0.

The metal oxide represented by the formula (I) wherein x is a numerical value other than 0 is a mixed metal oxide in which each metal element contained is uniformly distributed with regularity throughout the oxide and the compositional ratio of metal elements contained in the metal oxide is represented by a fixed chemical formula.

Specifically, such a metal oxide forms a perovskite structure, a spinel structure or the like, and examples thereof include nickel ferrite ($NiFe_2O_4$) and aqueous ferrite of zirconium ($Zr.Fe_2O_4 \cdot mH_2O$, wherein m is 0.5 to 6).

The inorganic ion adsorbent may contain a plurality of metal oxides represented by the formula (I).

The inorganic ion adsorbent preferably contains at least one material selected from any of the following groups (a) to (c) from the viewpoint of excellent adsorption performance for phosphorus, boron, fluorine and/or arsenic:

(a) hydrous titanium oxide, hydrous zirconium oxide, hydrous tin oxide, hydrous cerium oxide, hydrous lanthanum oxide and hydrous yttrium oxide, (b) a mixed metal oxide of at least one metal element selected from the group consisting of titanium, zirconium, tin, cerium, lanthanum and yttrium, and at least one metal element selected from the group consisting of aluminum, silicon and iron, and (c) activated alumina.

A material selected from any of the groups (a) to (c) may be used, materials selected from any of the groups (a) to (c) may be used in combination, or the respective materials of the groups (a) to (c) may be used in combination. For the combined use, a mixture of two or more materials selected from any of the groups (a) to (c) may be used, or a mixture of two or more materials selected from two or more of the groups (a) to (c) may be used.

The inorganic ion adsorbent may contain aluminum sulfate-impregnated activated alumina from the viewpoint of inexpensiveness and high adsorbing properties.

In addition to the metal oxide represented by the formula (I), it is more preferred for the inorganic ion adsorbent to further solid-dissolve a metal element other than M and N, from the viewpoint of inorganic ion adsorbing properties and production cost.

Examples thereof include iron solid-dissolved in hydrous zirconium oxide represented by $ZrO_2 \cdot mH_2O$ (m is a numerical value other than 0).

Examples of the salts of polyvalent metals include a hydrotalcite compound represented by the following formula (II):

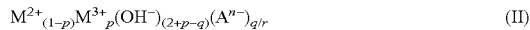
$$M^{2+}_{(1-p)}M^{3+}_{p}(OH^-)_{(2+p-q)}(A^{n-})_{q/r} \quad \quad (II)$$

In the formula (II), $M^{2+}$ is at least one divalent metal ion selected from the group consisting of $Mg^{2+}$, $Ni^{2+}$, $Zn^{2+}$, $Fe^{2+}$, $Ca^{2+}$ and $Cu^{2+}$.

$M^{3+}$ is at least one trivalent metal ion selected from the group consisting of $Al^{3+}$ and $Fe^{3+}$.

$A^{n-}$ is a n-valent anion.

p is $0.1 \leq p \leq 0.5$, q is $0.1 \leq q \leq 0.5$, and r is 1 or 2.

The hydrotalcite compound represented by the formula (II) is preferred because of an inexpensive raw material and high adsorbing properties as the inorganic ion adsorbent.

Examples of the insoluble aqueous oxides include insoluble heteropoly acid salts and insoluble hexacyanoferrate.

The inorganic ion adsorbent constituting the porous formed article of the present embodiment may contain a contaminating impurity element ascribable to a production method thereof, etc., without inhibiting the functions of the porous formed article of the present embodiment. Examples of the possible contaminating impurity element include nitrogen (nitrate nitrogen, nitrite nitrogen and ammonium nitrogen), sodium, magnesium, sulfur, chlorine, potassium, calcium, copper, zinc, bromine, barium and hafnium.

[Column]

In the case of using the porous formed article of the present embodiment as an adsorbing agent for the purpose of processing water, a column or an adsorption tower packed with the porous formed article is used. The high contact efficiency of the porous formed article can be sufficiently exploited by the contact of water to be processed with the porous formed article through fluid flow in the packed column or adsorption tower. The porous formed article of the present embodiment has a high abundance of the inorganic ion adsorbent on the surface of the adsorbing agent and can therefore perform ultrahigh-speed processing with sufficient adsorption performance by preventing an object to be adsorbed from leaking out (breaking through the column) from the initial stage of flushing.

The column means a tubular container having a solid-liquid separation unit such as a grating or a mesh in at least one of the lower portion and the upper portion such that the porous formed article does not flow out.

Examples of the material of the column include, but are not particularly limited to, stainless, FRP (glass fiber-reinforced plastic), glass and various plastics.

The inner face of the column may be provided with a rubber or fluorine resin lining in consideration of acid resistance.

[Method for Producing Porous Formed Article]

A method for producing the porous formed article of the present embodiment comprises the steps of: (1) crushing and mixing a good solvent for the organic polymer resin and the inorganic ion adsorbent to obtain slurry; (2) dissolving the organic polymer resin and a water-soluble polymer in the slurry obtained in the step (1); (3) shape-forming the slurry obtained in the step (2); (4) promoting coagulation of the shape-formed product obtained in the step (3) by controlling the temperature and humidity of a spatial portion coming into contact with the shape-formed product, until the shape-formed product is coagulated in a poor solvent; and (5) coagulating the coagulation-promoted shape-formed product obtained in the step (4), in a poor solvent.

(Step (1): Crushing and Mixing Step)

In the step (1), a good solvent for the organic polymer resin and the inorganic ion adsorbent are crushed and mixed to obtain slurry.

The inorganic ion adsorbent can be wet-crushed in the good solvent for the organic polymer resin to thereby finely pulverize the inorganic ion adsorbent. As a result, the inorganic ion adsorbent carried by the porous formed article after shape forming has only a small amount of secondary aggregates.

<Good Solvent for Organic Polymer Resin>

The good solvent for the organic polymer resin in the step (1) is not particularly limited as long as the good solvent stably dissolves more than 1% by mass of the organic polymer resin under production conditions for the porous formed article. A good solvent conventionally known in the art can be used.

Examples of the good solvent include dimethyl sulfoxide (DMSO), N-methyl-2-pyrrolidone (NMP), N,N-dimethylacetamide (DMAC) and N,N-dimethylformamide (DMF).

Only one of these good solvents may be used, or two or more thereof may be used as a mixture.

<Crushing and Mixing Unit>

In the step (1), the crushing and mixing unit used to obtain slurry is not particularly limited as long as the inorganic ion adsorbent and the good solvent for the organic polymer resin can be crushed and mixed together.

For example, a unit for use in a physical disruption method such as crushing under pressure, mechanical grinding or ultrasonic treatment can be used as the crushing and mixing unit.

Specific examples of the crushing and mixing unit include generator shaft-type homogenizers, blenders such as Waring blenders, media agitation mills such as sand mills, ball mills, attritors and beads mills, jet mills, mortars and pestles, stone mills and ultrasonic baths.

Among them, a media agitation mill is preferred because the media agitation mill has high crushing efficiency and can crush even highly viscous matter.

The ball size for use in the media agitation mill is not particularly limited and is preferably 0.1 to 10 mm. When the ball size is 0.1 mm or larger, the ball mass is sufficient. Therefore, the resulting media agitation mill has crushing power and high crushing efficiency. When the ball size is 10 mm or smaller, the resulting media agitation mill is excellent in finely crushing ability.

Examples of the material of the ball for use in the media agitation mill include, but are not particularly limited to, metals such as iron and stainless, oxides such as alumina and zirconia, and various ceramics of non-oxides such as silicon nitride and silicon carbide. Among them, zirconia is excellent in terms of excellent abrasion resistance and low contamination of products (contamination by abrasive matter).

<Dispersant>

In the step (1), a dispersant known in the art, such as a surfactant, may be added into the good solvent for the organic polymer resin mixed with the inorganic ion adsorbent during the crushing and mixing, without influencing the structure of the porous formed article.

(Step (2): Dissolution Step)

In the step (2), the organic polymer resin and a water-soluble polymer are dissolved in the slurry obtained by the step (1) to obtain slurry for shape forming.

The amount of the organic polymer resin added is preferably set such that an organic polymer resin/(organic polymer resin+water-soluble polymer+good solvent for the organic polymer resin) ratio is 3 to 40% by mass, more preferably 4 to 30% by mass. When the content of the organic polymer resin is 3% by mass or more, the resulting porous formed article has high strength. When the content is 40% by mass or less, the resulting porous formed article has a high porosity.

<Water-Soluble Polymer>

The water-soluble polymer in the step (2) is not particularly limited as long as the water-soluble polymer is compatible with the good solvent for the organic polymer resin and the organic polymer resin.

Any of natural, semisynthetic and synthetic polymers can be used as the water-soluble polymer.

Examples of the natural polymer include guar gum, locust bean gum, carrageenan, gum arabic, tragacanth, pectin, starch, dextrin, gelatin, casein and collagen.

Examples of the semisynthetic polymer include methylcellulose, ethylcellulose, hydroxyethylcellulose, ethylhydroxyethylcellulose, carboxymethyl starch and methyl starch.

Examples of the synthetic polymer include polyvinyl alcohol, polyvinylpyrrolidone, polyvinyl methyl ether, carboxyvinyl polymers, sodium polyacrylate and polyethylene glycols such as tetraethylene glycol and triethylene glycol.

Among them, a synthetic polymer is preferred from the viewpoint of enhancing carrying properties for the inorganic ion adsorbent, and polyvinylpyrrolidone and polyethylene glycols are more preferred from the viewpoint of improving porosity.

The mass-average molecular weights of the polyvinylpyrrolidone and the polyethylene glycols are preferably 400 to 35,000,000, more preferably 1,000 to 1,000,000, further preferably 2,000 to 100,000.

When the mass-average molecular weight is 2,000 or larger, the resulting porous formed article has high surface opening properties. When the mass-average molecular weight is 1,000,000 or smaller, shape forming tends to be easy because of the low viscosity of the slurry during the shape forming.

The mass-average molecular weight of the water-soluble polymer can be measured by the gel permeation chromatography (GPC) analysis of the water-soluble polymer dissolved in a predetermined solvent.

The amount of the water-soluble polymer added is preferably set such that a water-soluble polymer/(water-soluble polymer+organic polymer resin+good solvent for the organic polymer resin) ratio is 0.1 to 40% by mass, more preferably 0.5 to 30% by mass, further preferably 1 to 10% by mass.

When the amount of the water-soluble polymer added is 0.1% by mass or more, a porous formed article containing a fibrous structure where a three-dimensionally continuous network structure is formed in the outer surface and inside of the porous formed article is homogeneously obtained. When the amount of the water-soluble polymer added is 40% by mass or less, the outer surface opening ratio is proper. The resulting porous formed article can reliably adsorb ions even in high-speed fluid flow because the abundance of the inorganic ion adsorbent on the outer surface of the porous formed article is large.

(Step (3): Shape Forming Step)

In the step (3), the slurry (slurry for shape forming) obtained by the step (2) is shape-formed. The slurry for shape forming is mixed slurry of the organic polymer resin, the good solvent for the organic polymer resin, the inorganic ion adsorbent and the water-soluble polymer.

The form of the porous formed article of the present embodiment can adopt any form of particles, a thread, a sheet, a hollow fiber, a cylinder, a hollow cylinder and the like, depending on a method for shape-forming the slurry for shape forming.

Examples of the method for shape-forming the slurry into the form of particles include, but are not particularly limited to, a rotary nozzle method which involves using a nozzle disposed on the side of a rotating container so that the slurry for shape forming contained in the container is scattered from the nozzle to form liquid drops. By the rotary nozzle method, the slurry can be shape-formed into the form of particles having a uniform particle size distribution.

The diameter of the nozzle is preferably 0.1 to 10 mm, more preferably 0.1 to 5 mm. The nozzle having a diameter of 0.1 mm or larger easily scatters liquid drops. The nozzle having a diameter of 10 mm or smaller can render the particle size distribution uniform.

The centrifugal force is indicated by centrifugal acceleration and is preferably 5 to 1500 G, more preferably 10 to 1000 G, further preferably 10 to 800 G.

When the centrifugal acceleration is 5 G or larger, the formation of liquid drops and scattering are easy. When the centrifugal acceleration is 1500 G or smaller, the slurry for shape forming is discharged without becoming the form of a thread, and can prevent the particle size distribution from being widened. The narrow particle size distribution has the advantage that a column packed with the porous formed article has uniform water flow channels and therefore prevents ions (object to be adsorbed) from leaking out (breaking through the column) from the initial stage of flushing even if ultrahigh-speed flushing is used.

Examples of the method for shape-forming the slurry into the form of a thread or a sheet include a method which involves extruding the slurry for shape forming from a spinneret or a die having the corresponding shape, and coagulating the extrudate in a poor solvent.

The method for shape-forming the slurry into a porous formed article in the form of a hollow fiber employs a spinneret consisting of a circular orifice and can thereby shape-form the slurry in the same way as the method for shape-forming the slurry into a porous formed article in the form of a thread or a sheet.

The method for shape-forming the slurry into a porous formed article in the form of a cylinder or a hollow cylinder may coagulate the extrudate of the slurry for shape forming from a spinneret in a poor solvent while cutting the extrudate or may coagulate the extrudate into the form of a thread and then cut the thread.

(Step (4): Coagulation Promotion Step)

In the step (4), coagulation of the shape-formed product obtained by the step (3) is promoted by controlling the temperature and humidity of a spatial portion coming into contact with the shape-formed product, until the shape-formed product is coagulated in a poor solvent.

The step (4) can adjust the most frequent pore size and the outer surface opening ratio measured with a mercury porosimeter, and produces a formed article having a high abundance of the inorganic ion adsorbent. The porous formed article provided thereby can remove ions, particularly, phosphate ions, in water to be processed at an ultrahigh speed and has a large adsorption capacity.

The temperature and humidity of the spatial portion are controlled by covering the space between a coagulation vessel in which the poor solvent is retained and the rotary container with a cover to adjust the temperature of the poor solvent.

The temperature of the spatial portion is preferably 20 to 90° C., more preferably 25 to 85° C., further preferably 30 to 80° C.

When the temperature of the spatial portion is 20° C. or higher, the outer surface opening ratio of the porous formed article is increased. When the temperature is 90° C. or lower, the nozzle opening in the rotary container is less likely to be clogged by the slurry. Thus, the porous formed article can be stably produced for a long time.

The humidity of the spatial portion is relative humidity at the temperature and is preferably 65 to 100%, more preferably 70 to 100%, further preferably 75 to 100%.

When the relative humidity is 65% or higher, the outer surface opening ratio of the porous formed article is increased. When the relative humidity is 100% or lower, the nozzle opening in the rotary container is less likely to be clogged by the slurry. Thus, the porous formed article can be stably produced for a long time.

(Step (5): Coagulation Step)

In the step (5), the coagulation-promoted shape-formed product obtained in the step (4) is coagulated in a poor solvent to obtain a porous formed article.

<Poor Solvent>

A solvent having an organic polymer resin solubility of 1% by mass or less under the conditions of the step (5) can be used as the poor solvent in the step (5). Examples thereof include water, alcohols such as methanol and ethanol, ethers and aliphatic hydrocarbons such as n-hexane and n-heptane. Among them, water is preferred as the poor solvent.

In the step (5), the good solvent is brought in from the preceding steps so that the concentration of the good solvent varies between the start of the coagulation step and the end thereof. Therefore, the poor solvent may be supplemented with the good solvent in advance. It is preferred to perform the coagulation step by controlling the concentration while separately adding water or the like so as to maintain the initial concentration.

The concentration of the good solvent can be adjusted to thereby control the structure (outer surface opening ratio and particle shape) of the porous formed article.

When the poor solvent is water or a mixture of the good solvent for the organic polymer resin and water, the content of the good solvent for the organic polymer resin with respect to water in the coagulation step is preferably 0 to 80% by mass, more preferably 0 to 60% by mass.

When the content of the good solvent for the organic polymer resin is 80% by mass or less, the effect of improving the shape of the porous formed article is obtained.

The temperature of the poor solvent is preferably 40 to 100° C., more preferably 50 to 100° C., further preferably 60 to 100° C., from the viewpoint of controlling the temperature and humidity of the spatial portion in the step (4).

(Production Apparatus for Porous Formed Article)

A production apparatus for the porous formed article of the present embodiment has a rotary container which scatters liquid drops by centrifugal force, and a coagulation vessel which retains a coagulating liquid, and has a control unit which has a cover put over a spatial portion between the rotary container and the coagulation vessel and controls the temperature and humidity of the spatial portion.

The rotary container which scatters liquid drops by centrifugal force is not limited by a specific structure as long as the rotary container has the function of scattering the slurry for shape forming as spherical liquid drops by centrifugal force. Examples thereof include well-known rotary discs and rotary nozzles.

The rotary disc is configured such that the slurry for shape forming is supplied to the center of the rotating disc and then developed in a film form with a uniform thickness along the surface of the rotating disc so that the slurry is split dropwise by centrifugal force from the rim of the disc to scatter very small liquid drops.

The rotary nozzle is configured such that a large number of through-holes are formed in the peripheral wall of a hollow disc-shaped rotary container or a nozzle is attached to the rotary container so as to penetrate the peripheral wall, and the slurry for shape forming is supplied into the rotary container while the rotary container is rotated so that the slurry for shape forming is discharged by centrifugal force from the through-holes or the nozzle to form liquid drops.

The coagulation vessel which retains a coagulating liquid is not limited by a specific structure as long as the coagulation vessel has the function of being capable of retaining the coagulating liquid. Examples thereof include well-known coagulation vessels having an upper opening, and coagulation vessels having a structure where the coagulating liquid spontaneously flows downward by gravity along the inner face of a tubular body disposed so as to surround the rotary container.

The coagulation vessel having an upper opening is an apparatus in which the liquid drops scattered in a horizontal direction from the rotary container spontaneously flow downward and are then captured by the surface of the coagulating liquid retained in the coagulation vessel having an upper opening.

The coagulation vessel having a structure where the coagulating liquid spontaneously flows downward by gravity along the inner face of a tubular body disposed so as to surround the rotary container is an apparatus in which the coagulating liquid flows out in almost equal flow volumes in the circumferential direction along the inner face of the tubular body and spontaneously flows downward along the inner face so that the liquid drops are captured into the coagulating liquid flow and coagulated.

The control unit for the temperature and humidity of the spatial portion has a cover put over the spatial portion between the rotary container and the coagulation vessel and controls the temperature and humidity of the spatial portion.

The cover put over the spatial portion is not limited by a specific structure as long as the cover has the function of isolating the spatial portion from the external environment and facilitating practically controlling the temperature and humidity of the spatial portion. The cover can have, for example, a box, tubular, or umbrella shape.

Examples of the material of the cover include metallic stainless steels and plastics. The cover may be covered with a heat insulation material known in the art in terms of isolation from the external environment. The cover may be provided with a partial opening for temperature and humidity adjustment.

The control unit for the temperature and humidity of the spatial portion is not limited by a specific unit as long as the control unit has the function of controlling the temperature and humidity of the spatial portion. Examples thereof include heaters such as electric heaters and steam heaters and humidifiers such as ultrasonic humidifiers and heating humidifiers.

A unit of warming the coagulating liquid retained in the coagulation vessel and controlling the temperature and humidity of the spatial portion through the use of steam generated from the coagulating liquid is preferred in terms of a convenient structure.

[Purpose of Porous Formed Article]

The porous formed article of the present embodiment can be used in the field of processing at an ultrahigh speed such as a fluid flow rate (SV) of 120. The porous formed article of the present embodiment can be preferably used, particularly, as an adsorbing agent for ions such as phosphate, borate, arsenate, or fluoride ions for the purpose of production process water for metal plating, pharmaceutical production, etc. Among others, the porous formed article of the present embodiment can be more preferably used as an adsorbing agent for phosphate ions.

The porous formed article of the present embodiment has continuous holes densely developed in a three-dimensionally network pattern in the inside of the porous formed article and thus has high contact efficiency and a large adsorption capacity until an object to be processed breaks therethrough.

The porous formed article of the present embodiment can be used for the purpose of processing water, particularly, for the purpose of using water in metal plating, pharmaceutical production, etc., by exploiting the high contact efficiency.

The porous formed article of the present embodiment can be additionally used for purposes such as various adsorbing agents, deodorants, antimicrobial agents, moisture absorbing agents, freshness keeping agents for food, enzyme-immobilized carriers, and chromatography carriers, and for medical purposes such as blood processing.

In the case of using, for example, zeolite as the inorganic ion adsorbent according to the present embodiment, the porous formed article can be used as a deodorant.

When the inorganic ion adsorbent is zeolite and silver is carried by the zeolite, the porous formed article can be used as an antimicrobial agent. When palladium or platinum is carried by the zeolite, the porous formed article can be used as a freshness keeping agent because of adsorbing ethylene. When silver or copper is carried by the zeolite, the porous formed article can be used as a deodorant because of being able to adsorb and degrade an odorous gas such as hydrogen sulfide, ammonia, or methyl mercaptan.

EXAMPLES

Hereinafter, the present embodiment will be described with reference to Examples and Comparative Examples. However, the present invention is not limited by these examples. The physical properties of the porous formed article were measured by the following methods.

[Observation of Porous Formed Article Under Scanning Electron Microscope]

The observation of the porous formed article under a scanning electron microscope (SEM) was performed using scanning electron microscope model SU-70 manufactured by Hitachi, Ltd.

The porous formed article sample was held on a carbon adhesive tape/alumina sample table and electro-conductively coated with osmium (Os) to prepare an outer surface SEM observation sample.

[The Most Frequent Pore Size and Median Size Measured with Mercury Porosimeter]

The porous formed article was dried in vacuum at room temperature. Then, the most frequent pore size and median size were measured with a mercury porosimeter (manufactured by Shimadzu Corp., Shimadzu AutoPore model IV9500).

[Outer Surface Opening Ratio]

An image of the outer surface of the porous formed article photographed using a scanning electron microscope (SEM) was analyzed using image analysis software (manufactured by Asahi Kasei Engineering Corp., A-Zo-Kun (trade name)) to determine the outer surface opening ratio. More specifically, a threshold was manually adjusted such that the obtained SEM image was recognized as a grayscale image and the dark color portion and the light color portion corresponded to an opening and a porous structure (skeletal structure), respectively. The image was divided into the opening portion and the skeletal portion, and an area ratio thereof was determined. In order to reduce errors of threshold determination, the same measurement was performed for 10 images, and an average value was calculated.

[Specific Surface Area Measured with Mercury Porosimeter]

The porous formed article was dried in vacuum at room temperature. Then, the pore surface area $S(Hg)$ (m$^2$/g) per unit mass of the porous formed article was measured using a mercury porosimeter (manufactured by Shimadzu Corp., Shimadzu AutoPore model IV9500).

Then, the porous formed article in a state wetted with water was tapped using a measuring cylinder, and its apparent volume V (cm$^3$) was measured. Then, the porous formed article was dried in vacuum at room temperature, and the dry mass W (g) of the porous formed article was determined.

The specific surface area of the porous formed article was determined according to the following expression:

$$\text{Specific surface area (m}^2/\text{cm}^3) = S(Hg) \text{ (m}^2/\text{g)} \times \text{Bulk specific gravity (g/cm}^3)$$

$$\text{Bulk specific gravity (g/cm}^3) = W/V$$

In the expressions, $S(Hg)$ is the surface area (m$^2$/g) per unit mass of the porous formed article, W is the dry mass (g) of the porous formed article, and V is the apparent volume (cm$^3$) thereof.

[Average Particle Size of Porous Formed Article and Average Particle Size of Inorganic Ion Adsorbent]

The average particle size of the porous formed article and the average particle size of the inorganic ion adsorbent were measured using a laser diffraction/scattering particle size distribution measurement apparatus (LA-950 (trade name) manufactured by HORIBA, Ltd.). Water was used as a dispersion medium. In the case of using hydrous cerium oxide as the inorganic ion adsorbent, the sample was assayed by using the value of cerium oxide as a refractive index. Likewise, in the case of using hydrous zirconium oxide as the inorganic ion adsorbent, the sample was assayed by using the value of zirconium oxide as a refractive index.

[Amount of Phosphate Adsorbed]

Trisodium phosphate ($Na_3PO_4 \cdot 12H_2O$) was dissolved in distilled water to prepare a solution having a phosphate concentration of 9 mg-P/L. This solution was adjusted to pH 7 with sulfuric acid to prepare an adsorption bulk liquid.

A column (inside diameter: 10 mm) was packed with 8 mL of the porous formed article weighed by repetitive tapping using a measuring cylinder. The adsorption bulk liquid was injected thereto at rates of 960 mL/hr (SV120) and 240 mL/hr (SV30).

A discharged fluid (processed fluid) from the column was sampled every 30 minutes. The phosphate concentration in the processed water was measured, and the amount of phosphate adsorbed (g-P/L-porous formed article) was determined until exceeding 0.5 mg-P/L (ppm).

The phosphate ion concentration was measured using a phosphate measurement apparatus Phosphax Compact (trade name) manufactured by HACH.

A sample having an amount of phosphate adsorbed of 2.0 (g-P/L-porous formed article) or larger at a fluid flow rate (SV) of 120 was assessed as being a good phosphate adsorbing agent having a large adsorption capacity of the porous formed article.

Example 1

220 g of N-methyl-2-pyrrolidone (NMP, Mitsubishi Chemical Corp.) and 200 g of a hydrous cerium oxide powder having an average particle size of 30 μm (Iwatani Corp.) were added to a stainless ball mill pot (capacity: 1 L) packed with 1.5 kg of stainless balls having a diameter of 5 mmφ, and subjected to crushing and mixing treatment at 75 rpm for 150 minutes to obtain yellow slurry. To the obtained slurry, 4 g of polyvinylpyrrolidone (PVP, BASF Japan Ltd., Luvitec K30 Powder (trade name)) and 10 g of a copolymer consisting of 91.5% by mass of acrylonitrile, 8.0% by mass of methyl acrylate and 0.5% by mass of sodium methallylsulfonate and having limiting viscosity [η]=1.2 (organic polymer resin, PAN) were added, and the mixture was warmed to 60° C. in a dissolution vessel and dissolved with agitation using an agitation blade to obtain a homogeneous slurry solution for shape forming.

The obtained slurry solution for shape forming was warmed to 60° C. and supplied to the inside of a cylindrical rotary container in which a nozzle having a diameter of 4 mm was opened on the lateral side. This container was rotated to form liquid drops from the nozzle by centrifugal force (15 G). The spatial portion between the rotary container and a coagulation vessel was covered with a polypropylene cover to control the temperature and relative humidity of the spatial portion to 50° C. and 100%, respectively. The liquid drops were allowed to travel in this spatial portion and arrive at a coagulating liquid (content of NMP with respect to water: 50% by mass) warmed to 80° C., which was retained in a coagulation vessel having an upper opening, to coagulate the slurry for shape forming.

Washing and classification were further performed to obtain a spherical porous formed article.

An electron microscope photograph (magnification: ×10,000) showing the surface of the obtained porous formed article is shown in FIG. 1.

Example 2

A spherical porous formed article was obtained in the same way as the method described in Example 1 except that: the temperature of the coagulating liquid was set to 60° C.; and the temperature and relative humidity of the spatial portion were controlled to 37° C. and 100%, respectively.

Example 3

A spherical porous formed article was obtained in the same way as the method described in Example 1 except that the amount of the hydrous cerium oxide powder added was increased from 200 g to 300 g.

Example 4

A spherical porous formed article was obtained in the same way as the method described in Example 1 except that the amount of the hydrous cerium oxide powder added was decreased from 200 g to 150 g.

Example 5

A spherical porous formed article was obtained in the same way as the method described in Example 3 except that the nozzle on the lateral side of the cylindrical rotary container had a narrower diameter of 3 mm changed from 4 mm and was used in shape forming into the porous formed article.

Example 6

A spherical porous formed article was obtained in the same way as the method described in Example 3 except that the nozzle on the lateral side of the cylindrical rotary container had a thicker diameter of 5 mm changed from 4 mm and was used in shape forming into the porous formed article.

Example 7

A spherical porous formed article was obtained in the same way as the method described in Example 1 except that: the good solvent for the organic polymer resin was changed to 160 g of dimethyl sulfoxide (DMSO, Kanto Chemical Co., Inc.); the organic polymer resin was changed to 20 g of an ethylene vinyl alcohol copolymer (EVOH, The Nippon Synthetic Chemical Industry Co., Ltd., Soarnol E3803 (trade name)); the amount of the hydrous cerium oxide powder added was set to 250 g; the coagulating liquid was water; and the nozzle diameter was 5 mm.

Example 8

A spherical porous formed article was obtained in the same way as the method described in Example 1 except that: the organic polymer resin was changed to 30 g of polyethersulfone (Sumitomo Chemical Co., Ltd., Sumikaexcel 5003PS (trade name), OH-terminated grade); the water-soluble polymer was changed to 4 g of polyethylene glycol (PEG35,000, Merck Japan); the amount of the hydrous cerium oxide powder was set to 100 g; the coagulating liquid was water; and the nozzle diameter was 5 mm.

Example 9

A spherical porous formed article was obtained in the same way as the method described in Example 1 except that the inorganic ion adsorbent used was a hydrous zirconium oxide powder (Daiichi Kigenso Kagaku Kogyo Co., Ltd., R Zirconium Hydroxide (trade name)) dried with a constant mass in a dryer of 70° C.

Example 10

A spherical porous formed article was obtained in the same way as the method described in Example 7 except that: the inorganic ion adsorbent used was a hydrous zirconium oxide powder (Daiichi Kigenso Kagaku Kogyo Co., Ltd., R Zirconium Hydroxide (trade name)) dried with a constant mass in a dryer of 70° C.; and the nozzle diameter was 4 mm.

Example 11

A spherical porous formed article was obtained in the same way as the method described in Example 8 except that:

the inorganic ion adsorbent used was a hydrous zirconium oxide powder (Daiichi Kigenso Kagaku Kogyo Co., Ltd., R Zirconium Hydroxide (trade name)) dried with a constant mass in a dryer of 70° C.; and the nozzle diameter was 4 mm.

Example 12

A spherical porous formed article was obtained in the same way as the method described in Example 1 except that: the temperature of the coagulating liquid was set to 50° C.; and the temperature and relative humidity of the spatial portion were controlled to 31° C. and 80%, respectively.

Example 13

154 g of N-methyl-2-pyrrolidone (NMP, Mitsubishi Chemical Corp.) and 300 g of a hydrous cerium oxide powder having an average particle size of 30 μm (Iwatani Corp.) were added to a stainless ball mill pot (capacity: 1 L) packed with 1.5 kg of stainless balls having a diameter of 5 mmϕ, and subjected to crushing and mixing treatment at 75 rpm for 150 minutes to obtain yellow slurry. To the obtained slurry, 15 g of polyethersulfone (Sumitomo Chemical Co., Ltd., Sumikaexcel 5003PS (trade name), OH-terminated grade) was added, and the mixture was warmed to 60° C. in a dissolution vessel and dissolved with agitation using an agitation blade to obtain a homogeneous slurry solution for shape forming.

The obtained slurry solution for shape forming was warmed to 60° C. and supplied to the inside of a cylindrical rotary container in which a nozzle having a diameter of 4 mm was opened on the lateral side. This container was rotated to form liquid drops from the nozzle by centrifugal force (15 G). The spatial portion between the rotary container and a coagulation vessel was covered with a polypropylene cover to control the temperature and relative humidity of the spatial portion to 30° C. and 70%, respectively. The liquid drops were allowed to travel in this spatial portion and arrive at a coagulating liquid (content of NMP with respect to water: 10% by mass) warmed to 40° C., which was retained in a coagulation vessel having an upper opening, to coagulate the slurry for shape forming.

Washing and classification were further performed to obtain a spherical porous formed article.

Example 14

A spherical porous formed article was obtained in the same way as the method described in Example 1 except that: 160 g of N-methyl-2-pyrrolidone (NMP, Mitsubishi Chemical Corp.) was used; the organic polymer resin was changed to 30 g of polyethersulfone (Sumitomo Chemical Co., Ltd., Sumikaexcel 5003PS (trade name), OH-terminated grade); the water-soluble polymer was changed to 4 g of polyethylene glycol (PEG35,000, Merck Japan); and the amount of the hydrous cerium oxide powder added was set to 100 g.

Example 15

A spherical porous formed article was obtained in the same way as the method described in Example 14 except that: the temperature of the coagulating liquid was set to 60° C.; and the temperature and relative humidity of the spatial portion were controlled to 37° C. and 90%, respectively.

Comparative Example 1

A spherical porous formed article was obtained in the same way as the method described in Example 2 except that the spatial portion between the rotary container and the coagulation vessel was not covered with a polypropylene cover. The temperature and relative humidity of this spatial portion were 26° C. and 63%, respectively.

Comparative Example 2

A porous formed article was obtained with reference to Example 1 of Patent Literature 3 (International Publication No. WO 2011/062277).

A spherical porous formed article was obtained in the same way as the method described in Example 8 except that: the spatial portion between the rotary container and the coagulation vessel was not covered with a polypropylene cover; and the temperature of the coagulating liquid was set to 60° C. The temperature and relative humidity of this spatial portion were 26° C. and 63%, respectively.

Comparative Example 3

A porous formed article was obtained with reference to Example 2 of Patent Literature 1 (International Publication No. WO 2005/056175).

A spherical porous formed article was obtained in the same way as the method described in Example 7 except that: the spatial portion between the rotary container and the coagulation vessel was not covered with a polypropylene cover; and the temperature of the coagulating liquid was set to 60° C. The temperature and relative humidity of this spatial portion were 26° C. and 63%, respectively.

Tables 1 and 2 show the physical properties of the porous formed articles obtained in Examples 1 to 15 and Comparative Examples 1 to 3.

The results of Examples 1 to 15 demonstrated that a porous formed article produced by controlling the high temperature and relative humidity of the spatial portion using a granulation apparatus having the spatial portion with a cover has a high amount of phosphate adsorbed at the time of high-speed flushing (SV120) because of an appropriate outer surface opening ratio and a large abundance of the inorganic ion adsorbent in the vicinity of the outer surface.

The results of Comparative Examples 1 to 3 demonstrated a porous formed article produced using a granulation apparatus of the conventional technique having the spatial portion without a cover has a low amount of phosphate adsorbed at the time of high-speed flushing (SV120).

TABLE 1

| | Example 1 | Example 2 | Example 3 | Example 4 | Example 5 | Example 6 | Example 7 | Example 8 | Example 9 |
|---|---|---|---|---|---|---|---|---|---|
| Organic polymer resin | PAN | PAN | PAN | PAN | PAN | PAN | EVOH | PES | PAN |
| Inorganic ion adsorbent | C | C | C | C | C | C | C | C | Z |
| Presence or absence of cover used for spatial portion | Present | Present | Present | Present | Present | Present | Present | Present | Present |
| Relative humidity of spatial portion (%) | 100 | 100 | 100 | 100 | 100 | 100 | 100 | 100 | 100 |

TABLE 1-continued

|  | Example 1 | Example 2 | Example 3 | Example 4 | Example 5 | Example 6 | Example 7 | Example 8 | Example 9 |
|---|---|---|---|---|---|---|---|---|---|
| Temperature of spatial portion (° C.) | 50 | 37 | 50 | 50 | 50 | 50 | 50 | 50 | 50 |
| Coagulating liquid temperature (° C.) | 80 | 60 | 80 | 80 | 80 | 80 | 80 | 80 | 80 |
| Coagulating liquid composition (good solvent/water) | 50/50 | 50/50 | 50/50 | 50/50 | 50/50 | 50/50 | 0/100 | 0/100 | 50/50 |
| Average particle size (μm) | 370 | 370 | 370 | 370 | 300 | 550 | 530 | 600 | 370 |
| Outer surface opening ratio (%) | 20 | 10 | 20 | 20 | 21 | 20 | 27 | 19 | 21 |
| Presence or absence of skin layer | Absent | Absent | Absent | Absent | Absent | Absent | Absent | Absent | Absent |
| The most frequent pore size measured with mercury porosimeter (μm) | 0.41 | 0.40 | 0.37 | 0.27 | 0.35 | 0.36 | 0.40 | 0.34 | 0.40 |
| Median size measured with mercury porosimeter (μm) | 0.40 | 0.37 | 0.31 | 0.28 | 0.32 | 0.31 | 0.36 | 0.31 | 0.41 |
| The most frequent pore size/median size ratio | 1.03 | 1.08 | 1.19 | 0.96 | 1.09 | 1.16 | 1.11 | 1.10 | 0.98 |
| Specific surface area measured with mercury porosimeter ($m^2/cm^3$) | 18 | 18 | 22 | 14 | 22 | 22 | 20 | 12 | 17 |
| Bulk specific gravity ($g/cm^3$) | 0.52 | 0.52 | 0.64 | 0.45 | 0.65 | 0.64 | 0.62 | 0.36 | 0.51 |
| Amount of phosphate adsorbed (g-P/L-Porous formed article) @SV120 | 2.9 | 2.6 | 3.2 | 2.3 | 4.0 | 2.1 | 2.1 | 2.0 | 2.4 |
| Amount of phosphate adsorbed (g-P/L-Porous formed article) @SV30 | 8.5 | 8.4 | 9.2 | 7.5 | 11.2 | 8.6 | 8.4 | 8.3 | 8.5 |

C: Hydrous cerium oxide,

Z: hydrous zirconium oxide

TABLE 2

|  | Example 10 | Example 11 | Example 12 | Example 13 | Example 14 | Example 15 | Comparative Example 1 | Comparative Example 2 | Comparative Example 3 |
|---|---|---|---|---|---|---|---|---|---|
| Organic polymer resin | EVOH | PES | PAN | PES | PES | PES | PAN | PES | EVOH |
| Inorganic ion adsorbent | Z | Z | C | C | C | C | C | C | C |
| Presence or absence of cover used for spatial portion | Present | Present | Present | Present | Present | Present | Absent | Absent | Absent |
| Relative humidity of spatial portion (%) | 100 | 100 | 80 | 70 | 100 | 90 | 63 | 63 | 63 |
| Temperature of spatial portion (° C.) | 50 | 50 | 31 | 30 | 50 | 37 | 26 | 26 | 26 |
| Coagulating liquid temperature (° C.) | 80 | 80 | 50 | 40 | 80 | 60 | 60 | 60 | 60 |
| Coagulating liquid composition (good solvent/water) | 0/100 | 0/100 | 50/50 | 10/90 | 50/50 | 50/50 | 50/50 | 0/100 | 0/100 |
| Average particle size (μm) | 370 | 370 | 370 | 370 | 370 | 370 | 370 | 600 | 530 |
| Outer surface opening ratio (%) | 20 | 18 | 6 | 5 | 29 | 15 | 4 | 3 | 30 |
| Presence or absence of skin layer | Absent | Absent | Absent | Absent | Absent | Absent | Absent | Absent | Absent |
| The most frequent pore size measured with mercury porosimeter (μm) | 0.39 | 0.35 | 0.39 | 0.08 | 0.67 | 0.55 | 0.78 | 0.07 | 2.00 |
| Median size measured with mercury porosimeter (μm) | 0.41 | 0.31 | 0.36 | 0.07 | 0.53 | 0.51 | 0.59 | 0.09 | 1.65 |
| The most frequent pore size/median size ratio | 0.95 | 1.13 | 1.08 | 1.14 | 1.26 | 1.08 | 1.32 | 0.78 | 1.21 |
| Specific surface area measured with mercury porosimeter ($m^2/cm^3$) | 16 | 17 | 17 | 29 | 15 | 16 | 17 | 8 | 4 |
| Bulk specific gravity ($g/cm^3$) | 0.51 | 0.51 | 0.52 | 0.87 | 0.45 | 0.45 | 0.51 | 0.36 | 0.61 |
| Amount of phosphate adsorbed (g-P/L-Porous formed article) @SV120 | 2.3 | 2.1 | 2.4 | 2.0 | 2.3 | 3.3 | 0.6 | 0.7 | 1.5 |

TABLE 2-continued

|  | Example 10 | Example 11 | Example 12 | Example 13 | Example 14 | Example 15 | Comparative Example 1 | Comparative Example 2 | Comparative Example 3 |
|---|---|---|---|---|---|---|---|---|---|
| Amount of phosphate adsorbed (g-P/L-Porous formed article) @SV30 | 8.4 | 8.3 | 8.4 | 5.2 | 5.9 | 9.1 | 3.1 | 3.7 | 3.7 |

C: Hydrous cerium oxide,
Z: hydrous zirconium oxide

The present application is based on Japanese Patent Application No. 2015-221666 filed on Nov. 11, 2015, the contents of which are incorporated herein by reference.

INDUSTRIAL APPLICABILITY

The porous formed article of the present invention has industrial applicability such that the porous formed article can be used for the purpose of production process water for metal plating, pharmaceutical production, etc. required to perform processing at an ultrahigh speed such as a fluid flow rate (SV) of 120.

REFERENCE SIGNS LIST

1 Tank
2 Pump
3 Spatial portion cover
4 Coagulation vessel
5 Rotary container
6 Rotary shaft
7 Hose
8 Heater
a Slurry for shape forming
b Opening
c Spatial portion
d Coagulating liquid

The invention claimed is:

1. A porous formed article comprising an organic polymer resin and an inorganic ion adsorbent and having the most frequent pore size of 0.08 to 0.70 μm measured with a mercury porosimeter; wherein a concentration of the inorganic ion adsorbent is higher at an outer surface of the porous formed article than an interior of the porous formed article.

2. The porous formed article according to claim 1, wherein an outer surface opening ratio is 5% or more and less than 30%.

3. The porous formed article according to claim 1, wherein a specific surface area measured with a mercury porosimeter is 10 to 100 m²/cm³.

4. The porous formed article according to claim 1, wherein a ratio of the most frequent pore size of a median size (the most frequent pore size/median size) measured with a mercury porosimeter is 0.80 to 1.30.

5. The porous formed article according to claim 1, wherein the porous formed article is spherical particles having an average particle size of 100 to 2500 μm.

6. The porous formed article according to claim 1, wherein the inorganic ion adsorbent contains at least one metal oxide represented by the following formula (I):

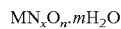

$$MN_xO_n \cdot mH_2O \quad (I)$$

wherein x is 0 to 3, n is 1 to 4, m is 0 to 6, and M and N are different from each other and each represent a metal element selected from the group consisting of Ti, Zr, Sn, Sc, Y, La, Ce, Pr, Nd, Sm, Eu, Gd, Tb, Dy, Ho, Er, Tm, Yb, Lu, Al, Si, Cr, Co, Ga, Fe, Mn, Ni, V, Ge, Nb and Ta.

7. The porous formed article according to claim 6, wherein the metal oxide contains at least one material selected from any of the following groups (a) to (c):
(a) hydrous titanium oxide, hydrous zirconium oxide, hydrous tin oxide, hydrous cerium oxide, hydrous lanthanum oxide and hydrous yttrium oxide,
(b) a mixed metal oxide of at least one metal element selected from the group consisting of titanium, zirconium, tin, cerium, lanthanum and yttrium, and at least one metal element selected from the group consisting of aluminum, silicon and iron, and
(c) activated alumina.

8. The porous formed article according to claim 1, wherein the organic polymer resin contains at least one component selected from the group consisting of an ethylene vinyl alcohol copolymer (EVOH), polyacrylonitrile (PAN), polysulfone (PS), polyethersulfone (PES) and polyvinylidene fluoride (PVDF).

9. A column packed with a porous formed article according to claim 1.

10. A porous formed article comprising an organic polymer resin and an inorganic ion adsorbent and having the most frequent pore size of 0.10 to 0.60 μm measured with a mercury porosimeter;
wherein the organic polymer resin contains at least one component selected from the group consisting of an ethylene vinyl alcohol copolymer (EVOH), polyacrylonitrile (PAN), polysulfone (PS), polyethersulfone (PES) and polyvinylidene fluoride (PVDF); and
wherein the metal oxide contains at least one material selected from any of the following groups (a) to (c):
(a) hydrous titanium oxide, hydrous zirconium oxide, hydrous tin oxide, hydrous cerium oxide, hydrous lanthanum oxide and hydrous yttrium oxide,
(b) a mixed metal oxide of at least one metal element selected from the group consisting of titanium, zirconium, tin, cerium, lanthanum and yttrium, and at least one metal element selected from the group consisting of aluminum, silicon and iron, and
(c) activated alumina.

11. The porous formed article according to claim 10, wherein an outer surface opening ratio is 5% or more and less than 30%.

12. The porous formed article according to claim 11, wherein a concentration of the inorganic ion adsorbent is higher at an outer surface of the porous formed article than an interior of the porous formed article.

* * * * *